(No Model.)
J. C. KARNATZ & W. WIESE.
STUMP PULLER.
No. 319,726. Patented June 9, 1885.
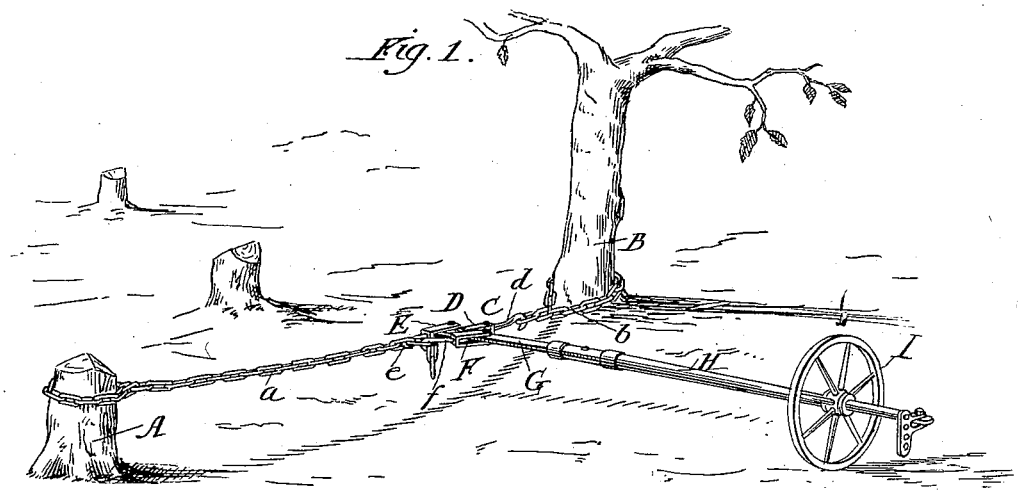
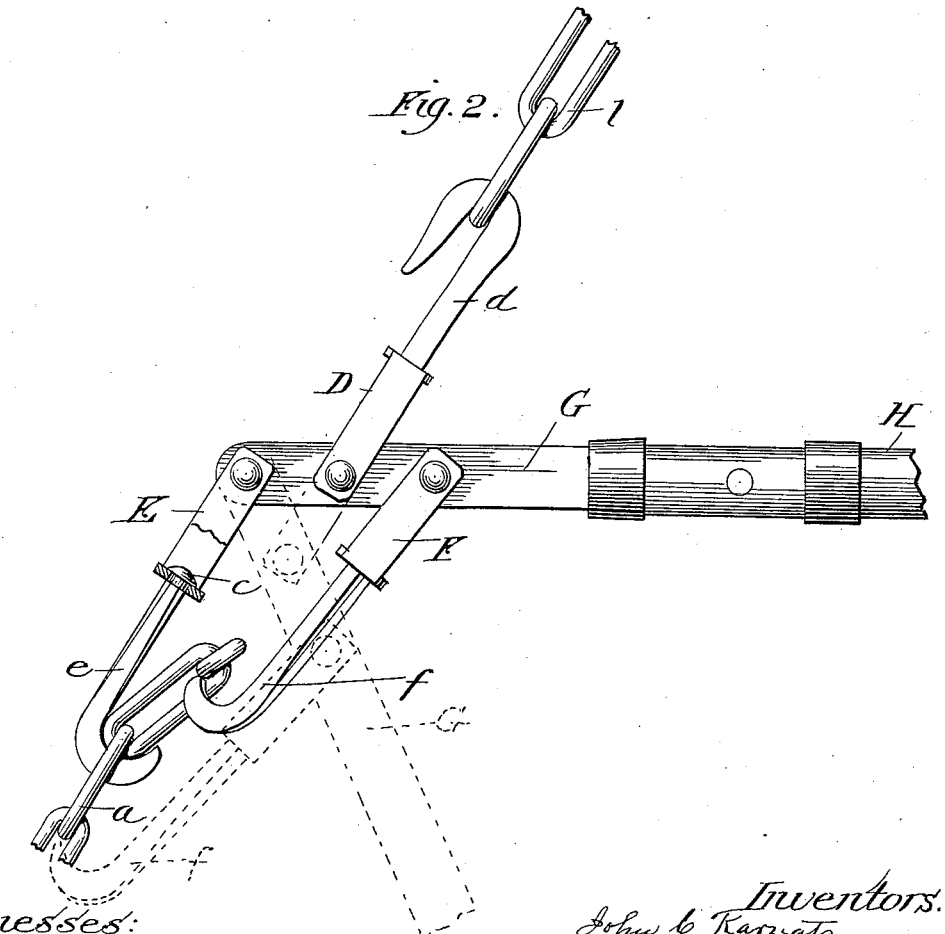
Witnesses:
Frank S. Blanchard
Louis Nolting
Inventors.
John C. Karnatz
William Wiese
By A. W. Stout
Attorney.
N. PETERS, Photo-Lithographer, Washington, D. C.

UNITED STATES PATENT OFFICE.

JOHN C. KARNATZ AND WILLIAM WIESE, OF FOREST GLEN, ILLINOIS.

STUMP-PULLER.

SPECIFICATION forming part of Letters Patent No. 319,726, dated June 9, 1885.

Application filed April 17, 1885. (No model.)

*To all whom it may concern:*

Be it known that we, JOHN C. KARNATZ and WILLIAM WIESE, of Forest Glen, county of Cook, and State of Illinois, have invented certain Improvements in Machines for Breaking and Tearing out the Roots of Stumps and Trees, of which the following is a specification.

Our invention relates to a machine for breaking and tearing out the roots of trees and stumps of trees, and will be hereinafter fully described with the accompanying drawings, in which—

Figure 1 represents a perspective, from a point above, of our machine in position to be operated; and Fig. 2 a detail view, upon an enlarged scale, of the parts of the same, parts of the lever and chains being broken away.

The main lever, by means of which the force used is exerted, is composed of two parts, the beam of wood H and the iron bar G, and the bar is made flat and broad to secure strength and stiffness, inasmuch as it is operated edgewise. The long end of the lever may be sustained by a wheel mounted upon it, as shown in Fig. 1, and it is provided with a clevis, so that the lever may be operated by a horse hitched to the same. At a suitable distance from the free end of the bar G is pivoted the frame D, provided with a hook, $d$, and by means of a chain, $b$, which is wrapped around and fastened to a tree, a fulcrum is furnished, as shown in Fig. 1. Two other like frames, E and F, provided, respectively, with like hooks $e$ and $f$, are pivoted to the bar G, one on either side of frame D, and both equidistant therefrom, but extending in the opposite direction to fulcrum-hook $d$.

A indicates a stump that is to be operated on, and a chain, one end of which is fastened around the stump as near the top end as possible, while the other and free end is the one upon which the pulling force is to be exerted by means of the lever. That force is exerted in the manner described, as follows:

In Fig. 2 is shown by broken lines the bar G and the hook $f$ in one of the links of the chain $a$ in position for the outer end of the lever to be forced back, and to pull against the stump A; and in the same figure the lever is shown in solid lines as having been already drawn back and having exerted its force, and the hook $e$ as having entered another and a forward link, and as having pulled the chain $a$ so far back that the hook $f$ is ready to drop out of the link after having done its work. Thus as the long end of the lever is moved in one direction the chain attached to the stump to be pulled is pulled the length of one of its links, and when moved in the opposite direction it is pulled the length of another link, and so on until the stump is torn up, one of the pulling-hooks maintaining its hold, while the other reaches forward to another link, and so on.

It is apparent that the chain $b$ is placed as low as possible on the tree B which is not to be pulled, while the chain $a$ is placed as high as possible on the stump A which is to be pulled out. In the case of the stump, therefore, it is itself used as a lever to break and pull out its own roots.

Our machine is not designed to pull a stump or tree directly up out of the ground at one exertion of power; but it is designed to exert its entire force to first break and pull out the roots of the stump on the side opposite to the hooks; and, secondly, to exert the same entire force to break and pull the roots on the other side. In other words, its whole power is exerted to do, say, one-half the work at one operation or effort and the other half in another effort.

The breaking or pulling out the roots of a green stump or tree requires an immense power, and one that is sufficient to strain the strongest lever, chains, and hooks, and therefore it is that to do one-half the work with the whole power used is an important point gained.

Our machine may be applied so as to pull a stump or tree from several different directions successively, or in two opposite directions successively, if one straight pull be not sufficient; but if one pull shall be sufficient in a given case to bring its body on a level with the ground, the roots will be so broken and pulled out on the side opposite the hooks that a continuous pull will bring out the roots on the other side also.

What we claim as our invention, and desire to secure by Letters Patent, is—

1. The lever G H, provided with hook $d$, pivoted on one side of bar G, and the hooks e and f, pivoted on the opposite side of the same bar at equal distances therefrom, the whole adapted to operate chains a and b, substantially as described.

2. The combination of the lever G H and the wheel I, substantially as and for the purpose described.

3. The apparatus composed of lever G H, hooks d, e, and f, and chains a and b, substantially as and for the purpose described.

JOHN C. KARNATZ.
WIL. WIESE.

Witnesses:
LOUIS NOLTING,
FRANK S. BLANCHARD.